(12) United States Patent
Whitman

(10) Patent No.: US 11,506,296 B1
(45) Date of Patent: Nov. 22, 2022

(54) SAFETY VALVE STEM CAP WITH RECESSED VALVE TOOL FOR RECREATIONAL INNER TUBES

(71) Applicant: Lucian D. Whitman, Lake Isabella, CA (US)

(72) Inventor: Lucian D. Whitman, Lake Isabella, CA (US)

( * ) Notice: Subject to any disclaimer, the term of this patent is extended or adjusted under 35 U.S.C. 154(b) by 0 days.

(21) Appl. No.: 17/352,675

(22) Filed: Jun. 21, 2021

(51) Int. Cl.
  *F16K 15/20* (2006.01)
  *B63B 34/52* (2020.01)
  *B25B 27/24* (2006.01)

(52) U.S. Cl.
  CPC .......... *F16K 15/205* (2013.01); *B25B 27/24* (2013.01); *B63B 34/52* (2020.02); *Y10T 137/3755* (2015.04); *Y10T 137/3771* (2015.04); *Y10T 137/3786* (2015.04); *Y10T 137/6109* (2015.04); *Y10T 137/6154* (2015.04)

(58) Field of Classification Search
  CPC ....... F16K 15/205; B25B 27/24; B60C 25/18; Y10T 137/3755; Y10T 137/3771; Y10T 137/3786; Y10T 137/6109; Y10T 137/6154; B63B 34/52
  See application file for complete search history.

(56) References Cited

U.S. PATENT DOCUMENTS

| | | | |
|---|---|---|---|
| 1,487,932 A | 3/1924 | Giffin | |
| 2,320,042 A * | 5/1943 | McMahan | B60C 5/004 137/319 |
| 3,025,734 A * | 3/1962 | Ash | B60C 29/00 81/451 |
| 3,861,249 A * | 1/1975 | Lindquist | B25B 27/24 81/15.4 |
| 6,152,165 A * | 11/2000 | Fukuda | B25B 13/48 137/223 |
| 6,612,005 B2 * | 9/2003 | Rivers | B25B 27/24 29/221.5 |
| D775,293 S | 12/2016 | Miller et al. | |
| 9,925,651 B1 * | 3/2018 | Solomon | B25B 13/54 |

OTHER PUBLICATIONS

"Tire Deflator Combo Tool Set for TPMS Valve Stems," Copyright © 1995-2021 eBay Inc.:https://www.ebay.com/itm/191703336466?mkevt=1&mkcid=1&mkrid=711-53200-19255-0&campid=5338722076&toolid=10001.
"Tusk Billet Aluminum Valve Stem Caps W/Core Remover," © 2021 Rocky Mountain ATV/MC.: https://www.rockymountainatvmc.com/tires-and-wheels/tusk-billet-aluminum-valve-stem-caps-w-core-remover-p.
"Trans American Swim and Snow Adventure Tube," © 1996-2021, Amazon.com, Inc.: https://www.amazon.com/dp/B07HGJTZ3R?tag=imgwb-20&linkCode=ogi&th=1&psc=1.

* cited by examiner

*Primary Examiner* — Kevin F Murphy
(74) *Attorney, Agent, or Firm* — Nath, Goldberg & Meyer; Richard C. Litman

(57) ABSTRACT

A safety valve stem cap includes a valve tool that can be used for removing the valve stem and quickly deflating the tube for travel or storage. The valve stem cap has a frusto-conical-shaped body with a circular bottom edge and a flat upper surface. The valve tool extends within a recess defined within the cap body. The valve tool includes a planar floor and two upright prongs extending from the floor. In an embodiment, the floor of the valve tool is integrally connected with the cap body. In an embodiment, the valve tool includes a hollow body mounted within the recess. The planar floor and upright prongs extend within the hollow body.

12 Claims, 4 Drawing Sheets

SAFETY VALVE STEM CAP WITH RECESSED VALVE TOOL FOR RECREATIONAL INNER TUBES

BACKGROUND

1. Field

The disclosure of the present patent application relates to recreational inner tubes, and particularly, to a safety valve stem cap with a recessed valve tool for recreational inner tubes.

2. Description of the Related Art

Rubber inner tubes have been used recreationally for decades, for example to float down a river, in a swimming pool or other body of water, or to slide down a wet or snowy hill. Initially, these tubes were repurposed from truck tire inner tubes. These tubes have long metal valve stems that extend inwardly. This configuration of the valve stem can jab a person sitting inside the inner tube. To overcome this obvious disadvantage, short, rubber covered, straight stems such as types TR13 and TR15 valve stems, were introduced. As the small valve stems take a long time to deflate, a separate valve stem tool is needed for removing the valve stems from the base for rapid deflation of the inner tube.

Thus, a safety valve stem cap with recessed valve tool for recreational inner tubes solving the aforementioned problems is desired.

SUMMARY

A safety valve stem cap with a recessed valve tool for recreational inner tubes can be mounted on a valve stem of an inner tube to provide a barrier between the valve stem of the inner tube and a user. The cap includes a valve tool that can be used for removing the valve stem and quickly deflating the tube for travel or storage. The valve stem cap has a frustoconical-shaped body with a circular bottom edge and a flat upper surface. The valve tool extends within a recess defined within the cap body. The valve tool includes a planar floor and two rigid upright prongs extending from the planar floor. Upper edges of the prongs can be aligned with the upper surface of the cap body or extend below the upper surface of the cap body. In an embodiment, the floor of the valve tool is integrally connected with the cap body. In an embodiment, the valve tool includes a hollow body mounted within the recess. The planar floor and upright prongs extend within the hollow body. The valve tool may be made from a material selected from brass, metal, and plastic. The cap body may be made from a material selected from rubber and plastic.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
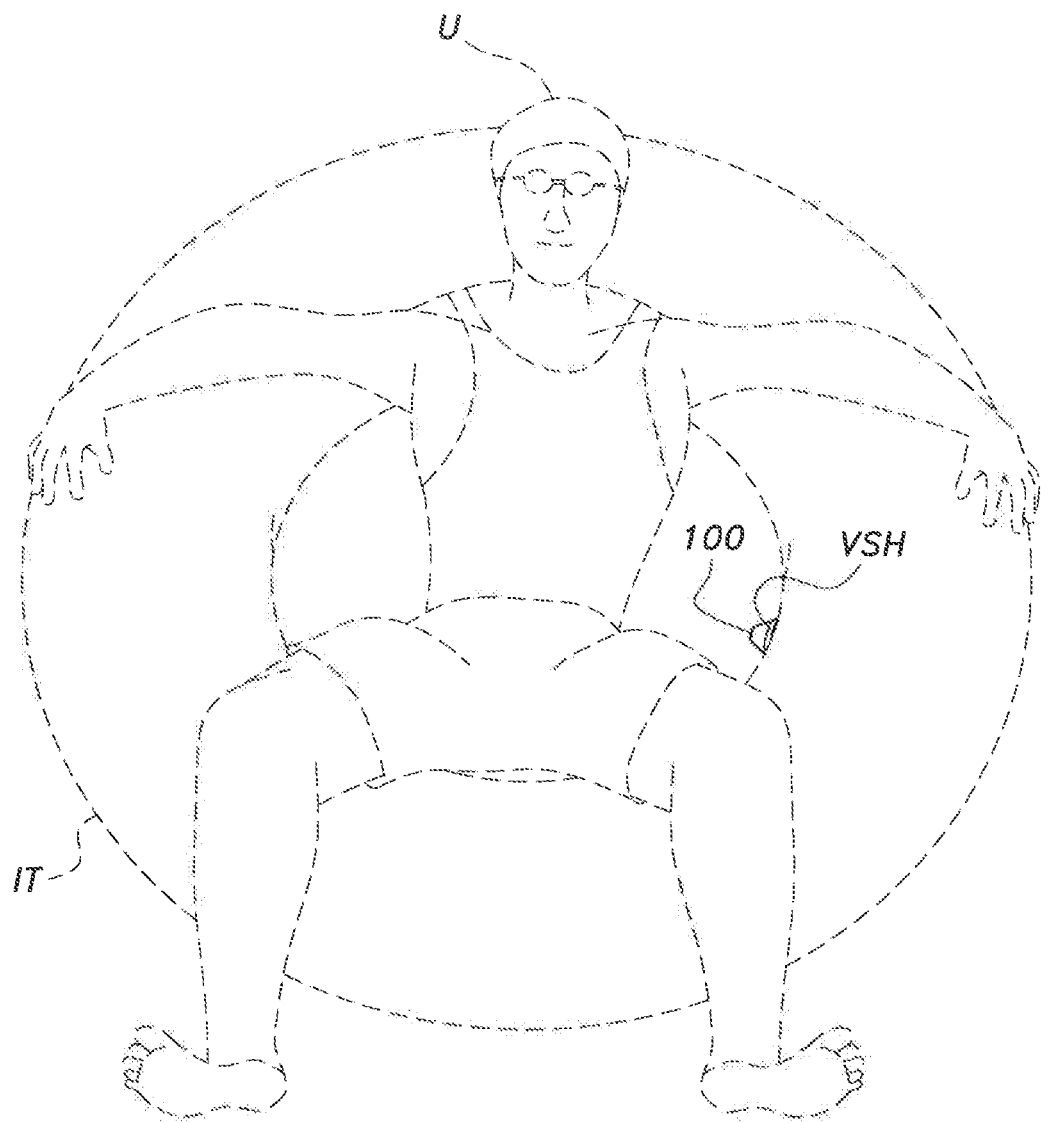
FIG. 1 is an environmental, perspective view of a safety valve stem cap with recessed valve tool for recreational inner tubes.

A safety valve stem cap 100 for recreational inner tubes is shown in FIG. 1, mounted on a conventional, recreational inner tube IT. A user U is shown sitting in the inside of the inner tube IT. Details of the safety valve stem cap 100 are shown in FIGS. 2-5.

Figure 2:
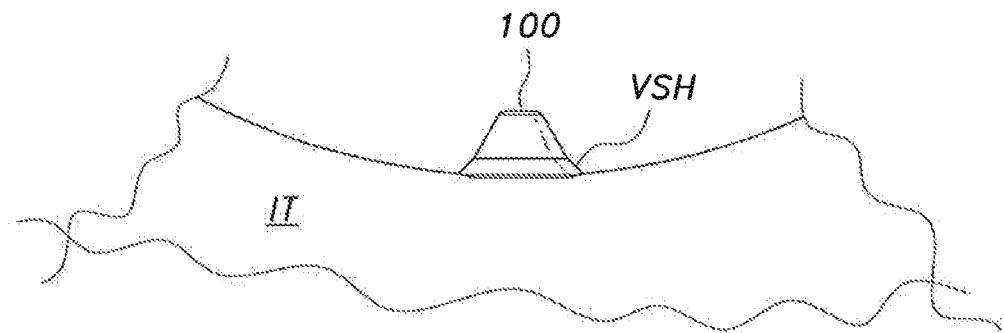
FIG. 2 is an environmental, side view of the safety valve stem cap of FIG. 1, showing the cap mounted on a valve stem housing.
Figure 3:
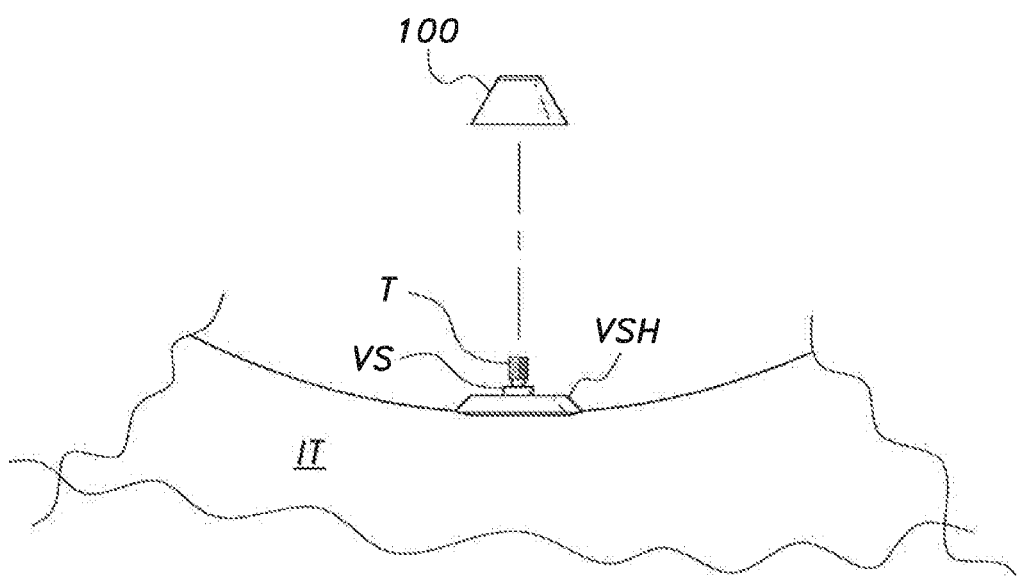
FIG. 3 is an environmental, exploded side view of the safety valve stem cap of FIG. 1, showing the cap removed from the valve stem housing.
Figure 4:
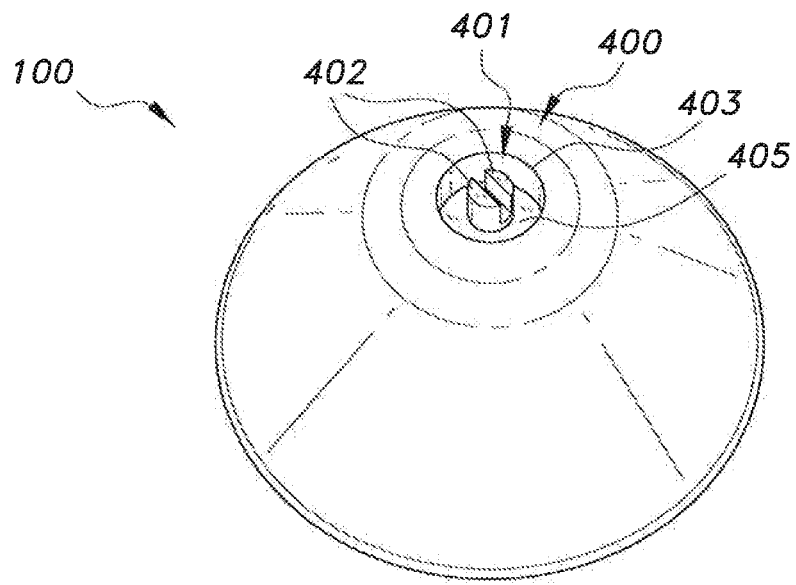
FIG. 4 is a top, perspective view of an embodiment of the safety valve stem cap of FIG. 1.

As shown in FIGS. 1-3, the safety valve stem cap 100 can be mounted on the valve stem housing VSH of the inner tube IT. The valve stem housing VSH includes a valve stem VS extending from the inner tube IT. The valve stem VS includes a generally cylindrical body, a hollow interior, and external threads T extending along an outer surface of the body. In an embodiment, the valve stem VS is a Schrader valve.

A first embodiment of the safety valve stem cap 100, shown in FIGS. 1-5, includes a generally frustoconical cap body. An outer portion of the body includes a flat upper surface 403. A valve tool 401 extends within a recess 400 defined within the cap body. The recess 400 has a diameter that is greater than a diameter of the valve stem VS. The valve tool 401 includes a generally planar floor 405 extending across the recess 400 and integral with the cap body and two valve tool prongs 402 extending upwardly from the floor 405. An upper edge of the prongs 402 can be aligned with the upper surface 403 of the safety valve stem cap 100 or extend below the upper surface 403 of the cap 100.

Figure 5:
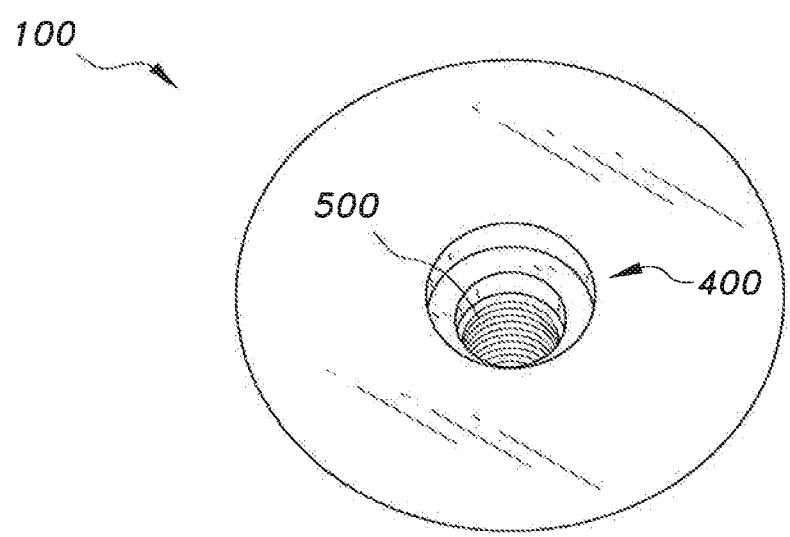
FIG. 5 is a bottom, perspective view of the safety valve stem cap of FIG. 4.

FIG. 5 depicts a lower surface of the valve stem cap 100 and a lower portion of the recess 400. As shown in FIG. 5, a lower portion of the recess 400 can be threaded. The threaded portion of the recess 400 can receive the valve stem VS and engage the external threads T of the valve stem VS to secure the valve stem cap 100 thereon.

For detaching the valve stem VS from the valve stem housing VSH, the cap 100 can be unscrewed from the valve stem VS and the prongs of the valve tool 400 can be inserted into the valve stem VS. Once the prongs of the valve stem VS securely engage the inner surface of the wall of the valve stem VS, the cap 100 can be twisted to disengage the valve stem VS from the valve stem housing VSH.

The stem cap 100 can be made from any suitable material, e.g., plastic, and may be made by injection molding.

Figure 6:
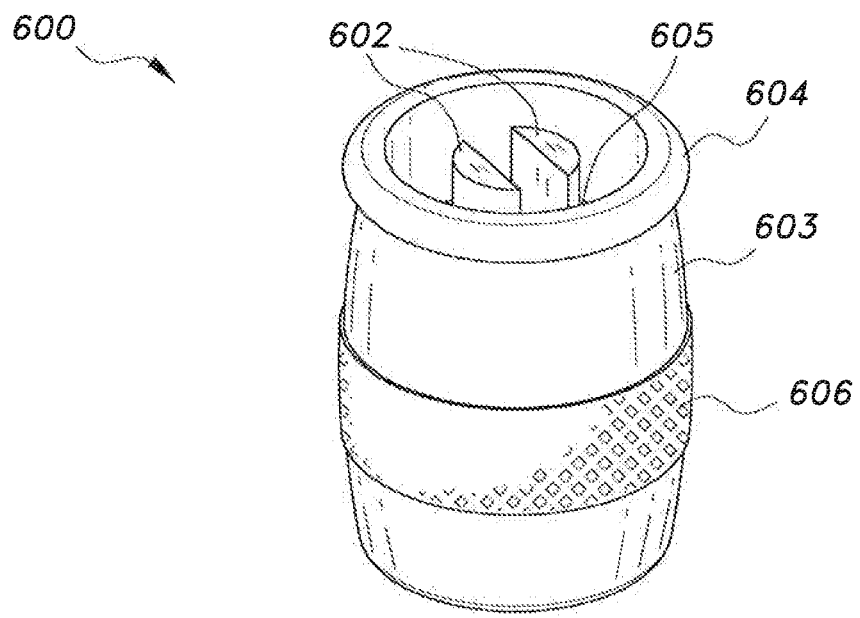
FIG. 6 is a perspective side view of an embodiment of a valve tool of the safety valve stem cap of FIG. 1.
Figure 7:
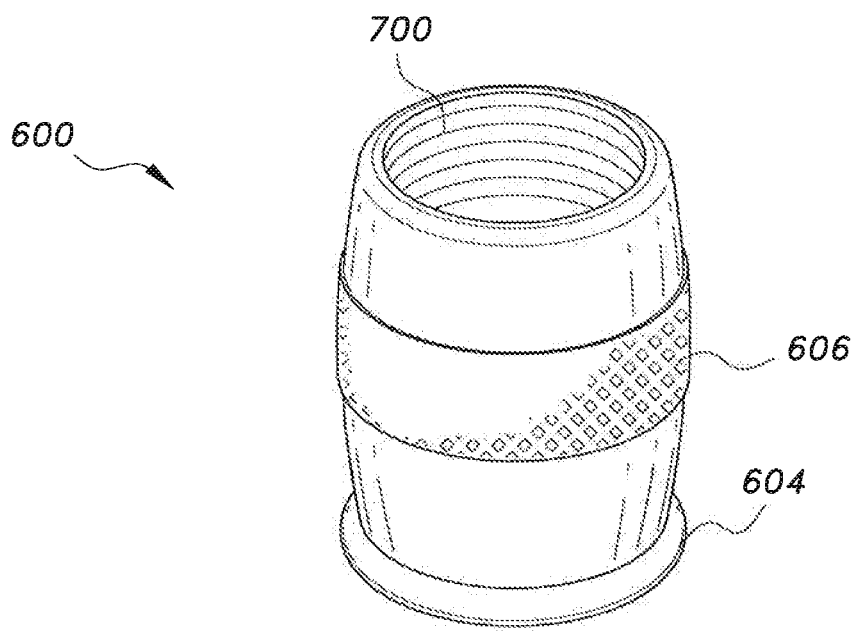
FIG. 7 is a perspective bottom view of the valve tool of FIG. 6.

Alternatively, the safety valve stem cap 100 may include a separate valve tool 600 positioned within the recess 400, as shown in FIGS. 6-7. The separate valve tool 600 can include a hollow, barrel-shaped body 603, a horizontal support 605 extending within the body 603, and a pair of prongs 602 extending upward from the horizontal support 605. An upper edge of the prongs can be aligned with an upper edge of the barrel-shaped body 603 or extend below the upper edge of the barrel-shaped body. An outer surface of the valve tool 603 can frictionally engage an inner wall of safety valve stem cap 100. The friction mounting allows the tool to be detached and used separately from the cap body. Alternatively, the valve tool 600 may be permanently attached to the inner wall of the cap body using an adhesive, for example, to facilitate use of the valve tool 600 while it is mounted in the cap body. A lower portion of the inner wall of the barrel-shaped body 603 can be threaded for matingly engaging the valve stem VS. The valve tool 600 may further include a knurled surface 606 along an outer surface of the body to facilitate grasping of the valve tool 600. A generally circular flange 604 with a rounded edge may depend from an upper edge of the valve tool 600. The valve tool 600 can be formed from any suitable rigid material, such as brass, metal, or plastic. The cap body can be formed from any flexible material, such as soft rubber or plastic.

For detaching the valve stem VS from the valve stem housing VSH, the prongs of the valve tool 600 can be inserted into the valve stem VS. Once the prongs of the valve stem VS securely engage the inner surface of the peripheral wall of the valve stem VS, the safety valve stem cap 100 can be twisted to disengage the valve stem VS from the valve stem housing VSH.

It is to be understood that the safety valve stem cap with recessed valve tool for flotation inner tubes is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A safety valve stem cap with recessed valve tool for recreational inner tubes, comprising:
    a cap body having a flat upper surface and a recess extending therethrough; and
    a valve tool extending within the recess, the valve tool having two rigid upright prongs extending from a planar floor; wherein the cap body is frustoconical.

2. The safety valve stem cap according to claim 1, wherein upper edges of the two upright prongs are aligned with the flat upper surface.

3. The safety valve stem cap according to claim 1, wherein upper edges of the two upright prongs extend below the flat upper surface.

4. The safety valve stem cap according to claim 1, wherein the cap body is made from a material selected from the group consisting of rubber and plastic.

5. The safety valve stem cap according to claim 1, wherein the planar floor is integrally connected to the cap body.

6. The safety valve stem cap according to claim 5, wherein a lower portion of the recess is threaded.

7. A safety valve stem cap with recessed valve tool for recreational inner tubes, comprising:
    a cap body having a flat upper surface and a recess extending therethrough; and
    a valve tool extending within the recess, the valve tool having two rigid upright prongs extending from a planar floor; wherein the valve tool comprises a hollow body disposed within the recess, the hollow body including a peripheral wall defining an opening therein, the planar floor and the two upright prongs extending within the opening, and a threaded portion defined along an inner surface of the peripheral wall.

8. The safety valve stem cap according to claim 7, wherein the valve tool detachably engages the cap body.

9. The safety valve stem cap according to claim 7, wherein the valve tool includes a metal material.

10. The safety valve stem cap according to claim 7, wherein the valve tool includes a plastic material.

11. The safety valve stem cap according to claim 7, wherein the cap body includes a rubber material and the valve tool includes a material selected from the group consisting of metal and plastic.

12. The safety valve stem cap according to claim 7, wherein the cap body includes a plastic material and the valve tool includes a material selected from the group consisting of metal and plastic.

* * * * *